United States Patent [19]
Fukatsu

[11] Patent Number: 5,870,152
[45] Date of Patent: Feb. 9, 1999

[54] CARRIER CHROMINANCE SIGNAL FORMING DEVICE

[75] Inventor: Tsutomu Fukatsu, Kanagawa-ken, Japan

[73] Assignee: Canon Kabushiki Kaisha, Tokyo, Japan

[21] Appl. No.: 883,279

[22] Filed: Jun. 26, 1997

Related U.S. Application Data

[63] Continuation of Ser. No. 569,457, Dec. 8, 1995, abandoned.

[30] Foreign Application Priority Data

Jan. 13, 1995 [JP] Japan .................................... 7-021318
Sep. 21, 1995 [JP] Japan .................................... 7-243032

[51] Int. Cl.[6] ...................................................... H04M 9/65
[52] U.S. Cl. .............................................................. 348/642
[58] Field of Search ..................................... 348/642, 641, 348/659, 661, 272, 453, 458; 358/310; H04N 11/20, 11/24

[56] References Cited

U.S. PATENT DOCUMENTS

| 4,727,361 | 2/1988 | Tokumitsu ................................. 358/23 |
| 4,982,179 | 1/1991 | Ogawa et al. ........................... 348/642 |
| 5,049,983 | 9/1991 | Matsumoto et al. ...................... 358/44 |
| 5,517,240 | 5/1996 | Fukatsu ................................... 348/223 |
| 5,528,306 | 6/1996 | Itoh ........................................ 348/453 |
| 5,548,325 | 8/1996 | Hashimoto et al. ...................... 348/64 |

*Primary Examiner*—Michael Lee
*Attorney, Agent, or Firm*—Robin, Blecker & Daley

[57] ABSTRACT

A carrier chrominance signal forming device is provided with input parts for receiving a plurality of kinds of complementary color signals and a carrier chrominance signal forming part for forming a carrier chrominance signal by performing computing operations on the complementary color signals received by the input parts. These parts are arranged to enable the device to stably form a carrier chrominance signal from the complementary color signals with a compact circuit arrangement.

29 Claims, 3 Drawing Sheets

CARRIER CHROMINANCE SIGNAL FORMING DEVICE

This is a continuation application under 37 CFR 1.62 of prior application Ser. No. 08/569,457 filed on Dec. 8, 1995 (abandoned).

BACKGROUND OF THE INVENTION

1. Field of the Invention

This invention relates to a carrier chrominance signal forming device for forming a carrier chrominance signal by processing an electrical signal obtained from an image sensor through photo-electric conversion.

2. Description of the Related Art

Generally, color television (TV) signals are transmitted in the form of having a carrier chrominance signal multiplexed with a luminance signal. The carrier chrominance signal is formed by modulating color signals obtained from an image pickup system with a color subcarrier of a predetermined frequency.

A modulation device for forming, for example, a carrier chrominance signal for a color TV signal of the NTSC system is arranged as follows. Color signals for colors R (red), G (green) and B (blue) are obtained from an image sensor. Color-difference signals R-Y and B-Y (wherein Y represents a luminance signal) are obtained by carrying out a matrix process on each of the color signals. From the color-difference signals and signals obtained by respectively multiplying the color-difference signals by "−1", a digital data series is formed to include a sequence of (R-Y), −(B-Y), −(R-Y) and (B-Y) according to the period of the color subcarrier specified by the NTSC system. A color-burst signal which has a predetermined phase and level at a specified position (leading edge of each horizontal line) is imparted to the digital data series. The digitial data series with the color-burst signal imparted is D/A converted according to a clock signal of a frequency which is four times as high as the frequency of the color subcarrier. A carrier chrominance signal is formed by restoring the D/A converted signal to an analog signal through a low-pass filter (LPF).

In a case where the color signals obtained from the image sensor are complementary color signals of yellow (Ye), cyan (Cy) and magenta (Mg), it is necessary to form the color-difference signals R-Y and B-Y by forming the color signals R, G and B from the complementary color signals through a computing process and then carrying out the matrix process on these color signals R, G and B. Therefore, a computing process for obtaining a carrier chrominance signal from the complementary color signals requires a circuit of a large scale, which increases the size of the whole apparatus.

In the case of a camera-integrated video tape recorder or the like, a picked-up image signal obtained from an image sensor of an image pickup system is recorded on a recording medium such as a magnetic tape or the like in the following manner. A luminance signal Y and color-difference signals of two kinds R-Y and B-Y are formed from the signal outputted from the image sensor. The luminance signal Y is frequency modulated. The two color-difference signals R-Y and B-Y are subjected to a quadrature two-phase balanced modulation process to form a carrier chrominance signal. The carrier chrominance signal thus formed is subjected to a so-called low-band converting process to make it into a low-band converted carrier chrominance signal. After that, the low-band converted carrier chrominance signal is frequency multiplexed with the frequency modulated luminance signal to obtain a recording video signal for recording on the recording medium.

However, in cases where a carrier chrominance signal is formed by a device of the above-stated kind or where a low-band converted carrier chrominance signal is formed by a camera-integrated video tape recorder, if the signals outputted from an image sensor are, for example, complementary color signals of yellow (Ye), cyan (Cy) and magenta (Mg), it is necessary to form the color signals of R, G and B respectively from these complementary color signals and also to form the color-difference signals R-Y and B-Y by carrying out a matrix process on the R, G and B color signals. In this case, a circuit which performs a computing process for obtaining the carrier chrominance signal or the low-band converted carrier chrominance signal from each of the complementary color signals must be arranged in a large scale, which increases the size of the whole apparatus.

SUMMARY OF THE INVENTION

It is a general object of this invention to provide a carrier chrominance signal forming device which is arranged to be capable of solving the problem of the prior art described in the foregoing.

It a more specific object of this invention to provide a carrier chrominance signal forming device which is capable of obtaining a carrier chrominance signal from a plurality of kinds of complementary color signals by means of a circuit which is compactly arranged.

Under this object, a carrier chrominance signal forming device arranged as an embodiment of this invention is provided with input means for receiving a plurality of kinds of complementary color signals, and carrier chrominance signal forming means for forming a carrier chrominance signal by performing a computing process on the plurality of kinds of complementary color signals received by the input means.

It is another object of this invention to provide a carrier chrominance signal forming device which is arranged to be capable of stably forming a carrier chrominance signal from a plurality of kinds of complementary color signals.

Under that object, a carrier chrominance signal forming device arranged as another embodiment of this invention is provided with first input means for receiving a first complementary color signal, second input means for receiving a second complementary color signal, third input means for receiving a third complementary color signal, first coefficient multiplying process means for multiplying by a first coefficient the first complementary color signal received by the first input means, second coefficient multiplying process means for multiplying by a second coefficient the second complementary color signal received by the second input means, third coefficient multiplying process means for multiplying by a third coefficient the third complementary color signal received by the third input means, fourth coefficient multiplying process means for multiplying by a fourth coefficient the first complementary color signal received by the first input means, fifth coefficient multiplying process means for multiplying by a fifth coefficient the second complementary color signal received by the second input means, sixth coefficient multiplying process means for multiplying by a sixth coefficient the third complementary color signal received by the third input means, first color-difference signal forming means for forming a first color-difference signal by performing an adding process to add together the first complementary color signal coefficient-multiplied by the first coefficient multiplying process means, the second complementary color signal coefficient-multiplied by the second coefficient multiplying process means and the third complementary color signal coefficient-multiplied by the third coefficient multiplying process means, second color-difference signal forming means for forming a second color-difference signal by performing an adding process to add together the first complementary color signal coefficient-multiplied by the fourth coefficient multiplying process means, the second complementary color signal coefficient-multiplied by the fifth coefficient multiplying process means and the third complementary color signal coefficient-multiplied by the sixth coefficient multiplying process means, first color-burst flag signal adding means for adding a color-burst flag signal to the first color-difference signal formed by the first color-difference signal forming means, second color-burst flag signal adding means for adding a color-burst flag signal to the second color-difference signal formed by the second color-difference signal forming means, inverted first color-difference signal forming means for forming an inverted first color-difference signal having a phase which differs 180 degrees from a phase of the first color-difference signal to which the color-burst flag signal has been added by the first color-burst flag signal adding means, inverted second color-difference signal forming means for forming an inverted second color-difference signal having a phase which differs 180 degrees from a phase of the second color-difference signal to which the color-burst flag signal has been added by the second color-burst flag signal adding means, and selective output means for sequentially outputting, in a sequence and at an interval according to a color subcarrier, the first color-difference signal to which the color-burst flag signal has been added by the first color-burst flag signal adding means, the second color-difference signal to which the color-burst flag signal has been added by the second color-burst flag signal adding means, the inverted first color-difference signal formed by the inverted first color-difference signal forming means and the inverted second color-difference signal formed by the inverted second color-difference signal forming means.

These and further objects and features of this invention will become apparent from the following detailed description of embodiments thereof taken in conjunction with the accompanying drawings.

DETAILED DESCRIPTION OF THE PREFERRED EMBODIMENTS

Embodiments of this invention are described with reference to the accompanying drawings.

Figure 1:
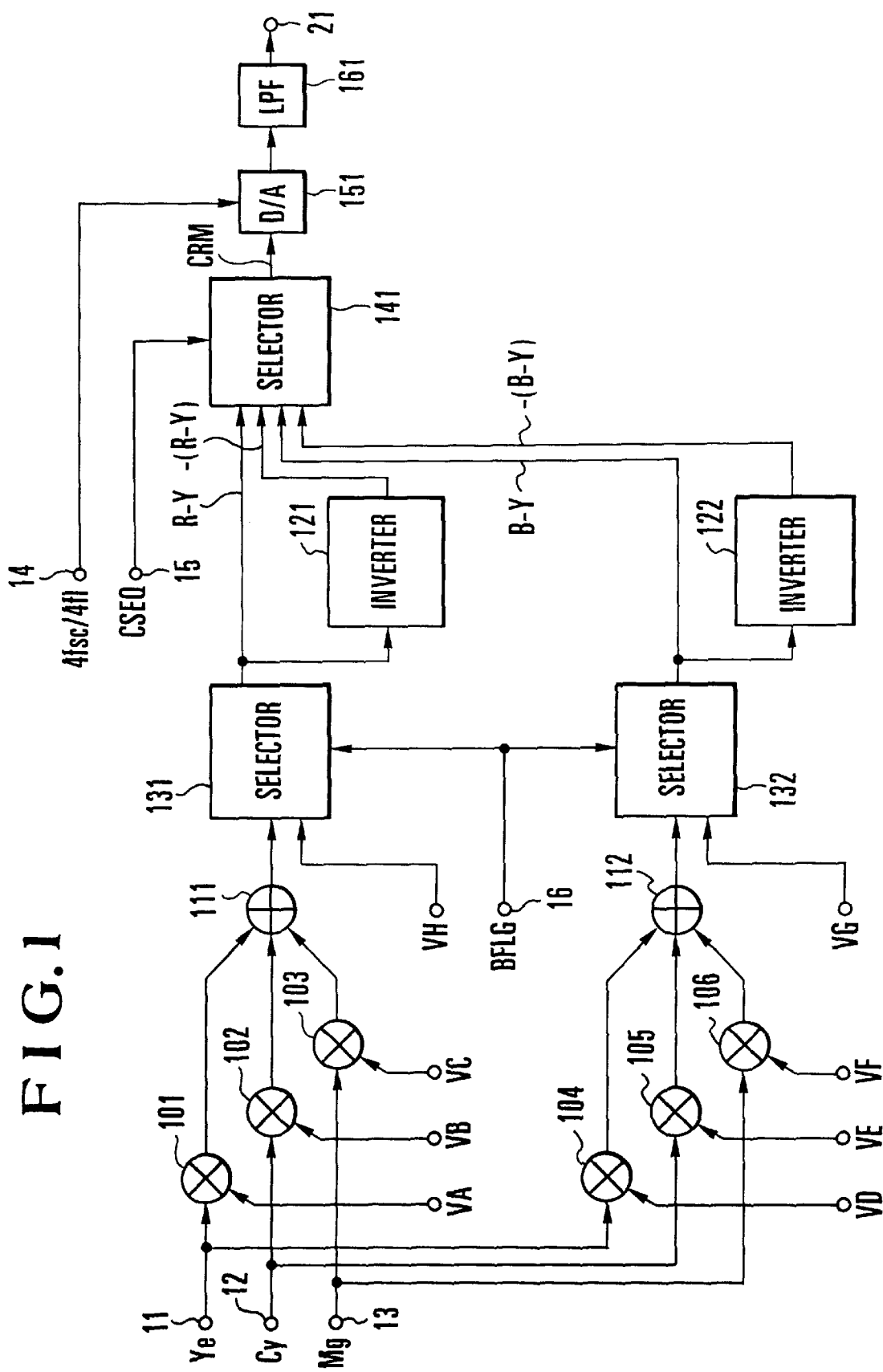
FIG. 1 is a block diagram showing the arrangement of a carrier chrominance signal forming device arranged according to this invention as an embodiment thereof.
Figure 2:
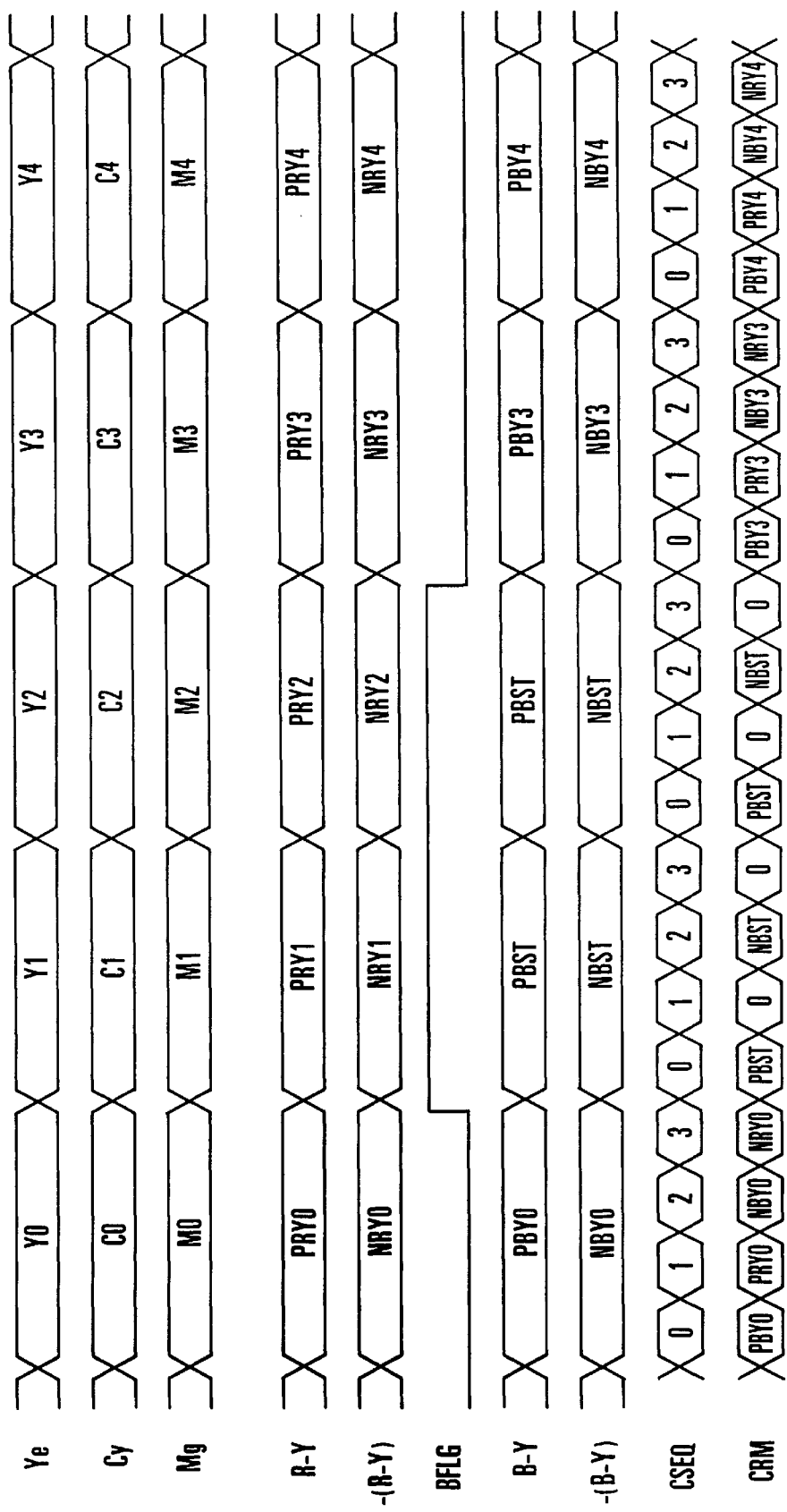
FIG. 2 is a timing chart showing the timing of signals obtained by the carrier chrominance signal forming device shown in FIG. 1.

FIG. 1 is a block diagram showing the arrangement of a carrier chrominance signal forming device according to this invention as an embodiment thereof. FIG. 2 is a timing chart showing the timing of signals obtained by the carrier chrominance signal forming device of FIG. 1.

In the case of the embodiment, the carrier chrominance signal forming device is arranged to form a carrier chrominance signal in conformity with the specifications of the NTSC system. Computing formulas to be used in forming the carrier chrominance signal in accordance with the specifications of the NTSC system are first described as follows:

A carrier chrominance signal C of the NTSC system can be expressed by a formula (1) as follows:

$$C = (1/1.14)(R-Y)\sin \omega t + (1/2.03)(B-Y)\cos \omega t \quad (1)$$

The color-difference signals R-Y and B-Y can be expressed by formulas (2) and (3) as follows:

$$\begin{aligned} R - Y &= R - (0.3R + 0.59G + 0.11B) \quad (2)\\ &= -0.7R + 0.59G + 0.11B \\ B - Y &= B - (0.3R + 0.59G + 0.11B) \quad (3)\\ &= 0.3R + 0.59G - 0.89B \end{aligned}$$

After the color-difference signals R-Y and B-Y are formed, a process is performed to form a digital data series having the sequence of (1/2.03) (B-Y), (1/1.14) (R-Y), −(1/2.03) (B-Y), −(1/1.14) (R-Y). To the digital data series is added color-burst data having a predetermined phase and a predetermined level. The digital data series with the color-burst data added is D/A converted according to a clock signal of a frequency four times as high as the frequency of a color subcarrier to obtain a D/A converted signal. The carrier chrominance signal C is obtained by restoring the D/A converted signal to an analog signal through a low-pass filter (LPF).

The color signals of R, G and B mentioned in the foregoing can be expressed respectively by formulas (4), (5) and (6), as follows:

$$R = (Ye - Cy + Mg)/2 \quad (4)$$

$$G = (Ye + Cy - Mg)/2 \quad (5)$$

$$B = (-Ye + Cy + Mg)/2 \quad (6)$$

Then, from the formulas (4), (5) and (6) above, the color-difference signals R-Y and B-Y can be expressed by formulas (7) and (8) as follows:

$$\begin{aligned} 2(R - Y) &= 0.7(Ye - Cy + Mg) \quad (7)\\ &\quad -0.59(Ye + Cy - Mg)\\ &\quad -0.11(-Ye + Cy + Mg)\\ &= 0.22Ye - 1.4Cy + 1.18Mg \\ 2(B - Y) &= -0.3(Ye - Cy + Mg) \quad (8)\\ &\quad -0.59(Ye + Cy - Mg)\\ &\quad +0.89(-Ye + Cy + Mg)\\ &= 1.78Ye + 0.6Cy + 1.18Mg \end{aligned}$$

Therefore, the carrier chrominance signal can be formed by sending out the signals according to the clock signal of the frequency four times as high as the frequency of the color subcarrier and also in the following sequence:

(−0.89 Ye+0.3 Cy+0.59 Mg)/2.03,
(0.11 Ye−0.7 Cy+0.59 Mg)/1.14,
−(−0.89 Ye+0.3 Cy+0.59 Mg)/2.03,
−(0.11 Ye−0.7 Cy+0.59 Mg)/1.14

The color-burst data part is then in a sequence of −0.4, 0, 0.4, 0.

Further, the axis of modulation does not have to coincide with the color-difference signals R-Y and B-Y. For example, assuming that the modulation axis has rotated as much as an angle θ, the data series can be expressed by formulas (9) and (10) and the color-burst data part by formulas (11) and (12) as follows:

$$(B - Y)' = [(B - Y)/2.03]\cos\theta - [(R - Y)/1.14]\sin\theta \quad (9)$$
$$= [(0.89/2.03)\cos\theta - (0.11/1.14)\sin\theta]Ye +$$
$$[(0.30/2.03)\cos\theta + (0.70/1.14)\sin\theta]Cy +$$
$$[(0.59/2.03)\cos\theta - (0.59/1.14)\sin\theta]Mg$$

$$(R - Y)' = [(B - Y)/2.03]\sin\theta + [(R - Y)/1.14]\cos\theta \quad (10)$$
$$= [(-0.89/2.03)\cos\theta + (0.11/1.14)\sin\theta]Ye +$$
$$[(0.30/2.03)\cos\theta - (0.70/1.14)\sin\theta]Cy +$$
$$[(0.59/2.03)\cos\theta + (0.59/1.14)\sin\theta]Mg$$

$$\text{burst } (b) = -0.4\cos\theta \quad (11)$$
$$\text{burst } (r) = -0.4\sin\theta \quad (12)$$

The carrier chrominance signal forming device is provided with three input terminals 11, 12 and 13, as shown in FIG. 1. A yellow complementary color signal Ye is inputted to the input terminal 11 from an image pickup system which is not shown. A cyan complementary color signal Cy is inputted from the image pickup system to the input terminal 12. A magenta complementary color signal Mg is inputted from the image pickup system to the input terminal 13.

The complementary color signal Ye inputted to the input terminal 11 is supplied to each of multipliers 101 and 104. The multiplier 101 multiplies the complementary color signal Ye by a multiplying coefficient VA and outputs the result of multiplication. The multiplier 104 multiplies the complementary color signal Ye by a multiplying coefficient VD and outputs the result of multiplication.

The complementary color signal Cy inputted to the input terminal 12 is supplied to each of multipliers 102 and 105. The multiplier 102 multiplies the complementary color signal Cy by a multiplying coefficient VB and outputs the result of multiplication. The multiplier 105 multiplies the complementary color signal Cy by a multiplying coefficient VE and outputs the result of multiplication.

The complementary color signal Mg inputted to the input terminal 13 is supplied to each of multipliers 103 and 106. The multiplier 103 multiplies the complementary color signal Mg by a multiplying coefficient VC and outputs the result of multiplication. The multiplier 106 multiplies the complementary color signal Mg by a multiplying coefficient VF and outputs the result of multiplication.

Assuming that the multiplying coefficients are of five bits and the phase of the modulation axis is at θ=80 degrees, for example, the values of the multiplying coefficients can be obtained from the formulas (9) and (10) as shown below:

| VA = −0.65625 | VB = 0.0625 | VC = 0.59375 |
| --- | --- | --- |
| VD = −0.28125 | VE = 1.0 | VF = −0.71875 |

The outputs of the multipliers 101, 102 and 103 are supplied to an adder 111. The adder 111 adds the outputs of the multipliers 101, 102 and 103 together and outputs the result of addition. The outputs of the multipliers 104, 105 and 106 are supplied to an adder 112. The adder 112 adds the outputs of the multipliers 104, 105 and 106 together and outputs the result of addition. The output of the adder 111 represents a color-difference signal R-Y and the output of the adder 112 represents a color-difference signal B-Y.

The output of the adder 111 is supplied to a selector 131 and the output of the adder 112 is supplied to a selector 132. The selector 131 selects and outputs, according to a signal BFLG inputted to a terminal 16, either the output of the adder 111 or a signal VH which represents color-burst data. The signal BFLG is a signal indicating a color-burst state. The selector 131 selects and outputs the signal VH when the level of the signal BFLG is high indicating the color-burst state, or the output of the adder 111 when the level of the signal BFLG is low indicating no color-burst state.

The selector 132 is likewise arranged to select and output, according to the signal BFLG, either the output of the adder 112 or a signal VG which represents color-burst data. The selector 132 selects and outputs the signal VG when the signal BFLG is at a high level thus indicating the color-burst state, or the output of the adder 112 when the signal BFLG is at a low level indicating no color-burst state.

For example, assuming that each of the multiplying coefficients consists of five bits and the phase of the modulation axis is at θ=80 degrees, the values of the signals VH and VG can be obtained from the above-stated formulas (11) and (12) as follows:

| VH = −0.0625 | VG = −0.625 |
| --- | --- |

The output of the selector 131 is supplied to a selector 141 and an inverter 121. The inverter 121 inverts the sign of the output of the selector 131 and outputs the inverted output. The phase of the output of the inverter 121 differs 180 degrees from that of the output of the selector 131. The output of the inverter 121 is supplied to the selector 141.

The output of the selector 132 is supplied to the selector 141 and an inverter 122. The inverter 122 inverts the sign of the output of the selector 132 and outputs the inverted output. The phase of the output of the inverter 122 differs 180 degrees from that of the output of the selector 132. The output of the inverter 122 is supplied to the selector 141.

The selector 141 is arranged to select and output one of the output of the selector 131, that of the inverter 121, that of the selector 132 and that of the inverter 122, according to a signal CSEQ which is inputted to a terminal 15. The signal CSEQ is composed of a selection signal which repeatedly appears at intervals of the period of a color subcarrier. The selector 141 outputs a digital data series CRM according to the selection signal. The digital data series CRM is composed of a data train appearing at every 90 degrees of a carrier chrominance signal.

The digital data series CRM from the selector 141 is supplied to a D/A converter 151. The D/A converter 151 is arranged to convert the digital data series CRM into an analog signal according to a clock signal 4fc which is inputted to a terminal 14. The clock signal 4fc is of a frequency value which is four times as much as the frequency of the color subcarrier.

The analog signal from the D/A converter 151 is supplied to a low-pass filter (LPF) 161 and is outputted from an output terminal 21 as an analog carrier chrominance signal.

The operation of the embodiment is described with reference to FIG. 2 as follows.

As shown in FIG. 2, signals Y0, Y1, Y2, . . . , are first serially inputted to the input terminal 11 as the yellow complementary color signal Ye. Signals C0, C1, C2, . . . , are likewise inputted to the input terminal 12 as the cyan complementary color signal Cy. Signals M0, M1, M2, . . . , are inputted to the input terminal 13 as the magenta complementary color signal Mg.

When the complementary color signal Y0 is inputted to the input terminal 11, the complementary color signal C0 to the input terminal 12 and the complementary color signal M0 to the input terminal 13, a signal PRY0 is formed as the color-difference signal R-Y, a signal NRY0 is formed as the color-difference signal -(R-Y), a signal PBY0 is formed as the color-difference signal B-Y, and a signal NBY0 is formed as the color-difference signal -(B-Y). A data series of PBY0, PRY0, NBY0 and NRY0 is formed as the data series CRM.

Next, the complementary color signal Y1 is inputted to the input terminal 11, the complementary color signal C1 to the input terminal 12 and the complementary color signal M1 to the input terminal 13. If the level of the signal BFLG becomes high when this data is inputted, a signal PBST is selected in place of the color-difference signal B-Y and a signal NBST in place of the color-difference signal -(B-Y). Then, a data series of PBST, 0, NBST and 0 is formed as the data series CRM. This data series CRM becomes a color-burst data part.

After that, the data series CRM is likewise formed and the digital data series with the color-burst data added thereto is D/A converted according to the clock signal of a frequency which is four times as high as the frequency of the color subcarrier. The D/A converted signal is restored to an analog signal through the LPF 161 to obtain the carrier chrominance signal.

Since the carrier chrominance signal is thus obtained by carrying out arithmetic operation processes such as multiplication and addition, it is not necessary to increase the scale of circuit arrangement.

In quantizing the coefficients of the formulas (9) and (10) by normalizing them, the absolute value sum of coefficient quantizing errors can be reduced by carrying cut the quantization by five bits at θ=80 degrees as compared with a case where the quantization by five bits is carried out at θ=0 degree. Further, with the value of θ appositely selected, the coefficient quantization error for a color which is considered to have relatively conspicuous fluctuations in hue with respect to visual sensations can be minimized.

As described above, the carrier chrominance signal forming device of this embodiment is arranged to receive the complementary color signals of yellow, cyan and magenta and to form a carrier chrominance signal by carrying out the process of arithmetic operations on these complementary color signals. The arrangement enables the embodiment to obtain the carrier chrominance signal with a compact circuit arrangement.

Another embodiment of this invention is described with reference to the drawings as follows.

Figure 3:
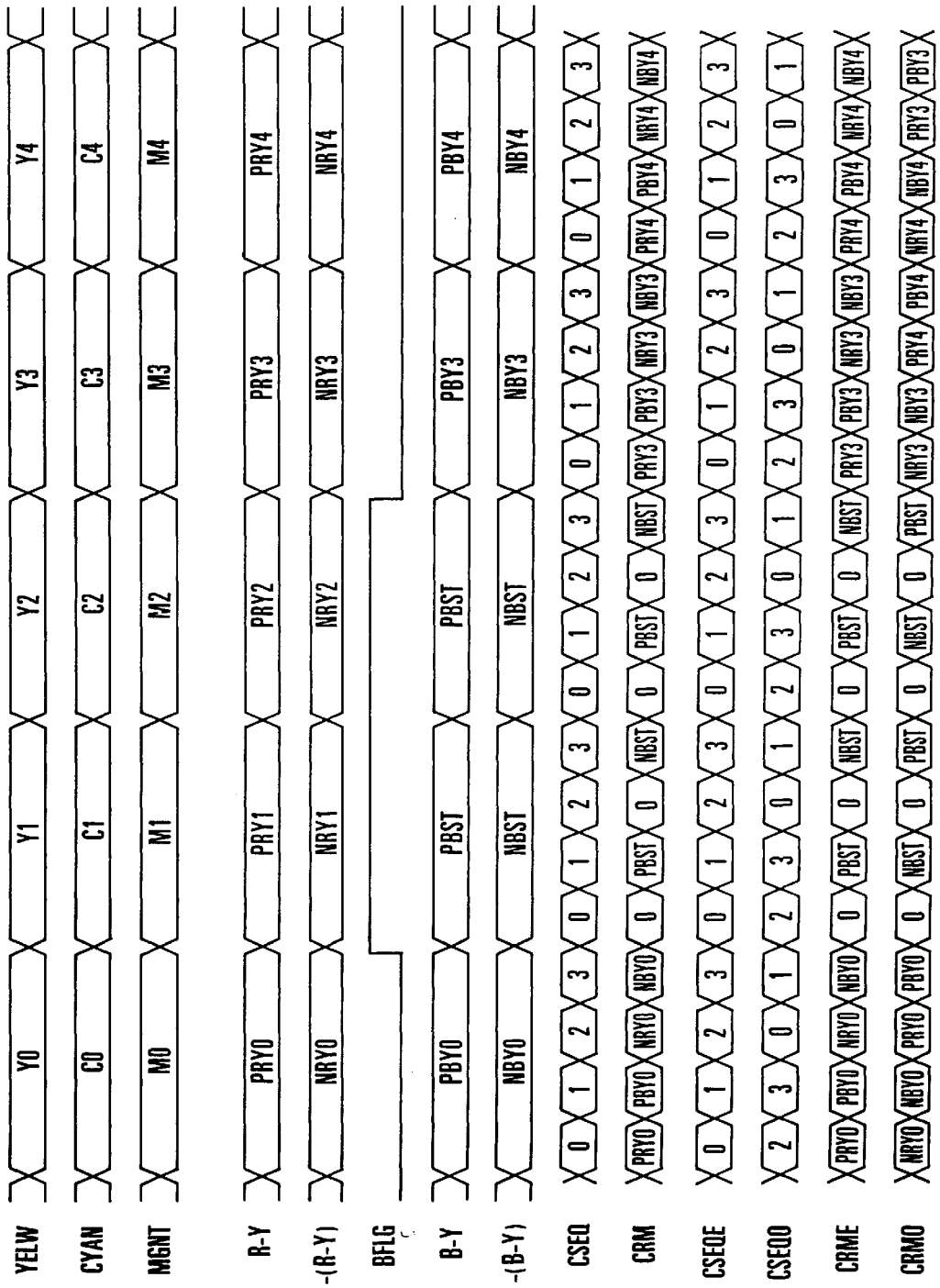
FIG. 3 is a timing chart showing the timing of signals obtained by a low-band converted carrier chrominance signal forming device which is arranged as another embodiment of this invention.

A low-band converted carrier chrominance signal forming device according to this embodiment is arranged in the same manner as the arrangement of the embodiment shown in the block diagram of FIG. 1. FIG. 3 is a timing chart showing the timing of signals obtained in the low-band converted carrier chrominance signal forming device. In the case of the low-band converted carrier chrominance signal forming device, a low-band converted carrier chrominance signal is formed in conformity to the specifications of the NTSC color TV system.

Computing formulas to be used in forming the low-band converted carrier chrominance signal in conformity with the specifications of the NTSC color TV system are first described as follows.

A carrier chrominance signal C of the NTSC color TV system can be expressed by a formula (1) as follows, as described in the foregoing:

$$C=(1/1.14)(R\text{-}Y)\sin \omega l+(1/2.03)(B\text{-}Y)\cos \omega l \quad (1)$$

wherein $\omega l=2\pi fsct$, and fsc is a color subcarrier frequency of the NTSC system.

The color-difference signals R-Y and B-Y can be expressed by formulas (2) and (3) as follows, in the same manner as described in the foregoing:

$$\begin{aligned} R-Y &= R-(0.3R+0.59G+0.11B) \\ &= -0.7R+0.59G+0.11B \end{aligned} \quad (2)$$

$$\begin{aligned} B-Y &= B-(0.3R+0.59G+0.11B) \\ &= 0.3R+0.59G-0.89B \end{aligned} \quad (3)$$

Then, to carry out a low-band converting process, the above-stated carrier chrominance signal C is multiplied by a carrier wave CL.

Assuming that $CL=\sin \phi$, $\phi=(\omega 2+\theta)$, $\omega 2=2\pi (fsc+fl)t$, wherein fl represents a low-band color subcarrier frequency, and θ is a phase, there is a following relation:

$$C \times CL = (B-Y)/(2 \times 2.03)[\sin(\phi+\omega l)+\sin(\phi-\omega l)] -$$
$$(R-Y)/(2 \times 1.14)[\cos(\phi+\omega l)+\cos(\phi-\omega l)]$$

wherein $\phi+\omega l=2\pi (2fsc+fl) t+\theta$, and $\phi-\omega l=2\pi fl\, t+\theta$ If the amplitude of the low-band color subcarrier is normalized by setting its phase at "0", a value Cfl obtained through an apposite filter process becomes:

$$Cfl=1/2.03(B\text{-}Y)\sin fl\, t+1+1/1.14(R\text{-}Y)\cos fl\, t$$

The low-band converted carrier chrominance signal is, therefore, nothing else but a signal obtained by quadrature two-phase-balanced modulating the color-difference signals.

Therefore, in forming the low-band converted carrier chrominance signal after the color-difference signals R-Y and B-Y are formed, a process is carried out in synchronism with a clock signal of a frequency four times as high as that of the low-band color subcarrier to form a digital data series having a sequence of (1/1.14)(R-Y), (1/2.03)(B-Y), -(1/1.14)(R-Y) and -(1/2.03)(B-Y). To the digital data series is added a color-burst data which has a predetermined phase and a predetermined level. The digital data series with the color-burst data added thereto is D/A converted according to a clock signal of a frequency four times as high as that of the low-band color subcarrier. The D/A converted signal is restored to an analog form through a low-pass filter (LPF) to obtain the low-band converted carrier chrominance signal C.

The above-stated color signals of R, G and B can be expressed, as mentioned in the foregoing, by formulas (4), (5) and (6), as follows:

$$R=(Ye\text{-}Cy+Mg)/2 \quad (4)$$

$$G=(Ye+Cy\text{-}Mg)/2 \quad (5)$$

$$B=(\text{-}Ye+Cy+Mg)/2 \quad (6)$$

Then, from the formulas (4), (5) and (6) above, the color-difference signals R-Y and B-Y can be expressed, as mentioned in the foregoing, by formulas (7) and (8) as follows:

$$\begin{aligned} 2(R-Y) &= 0.7(Ye-Cy+Mg) \\ &\quad -0.59(Ye+Cy-Mg) \\ &\quad -0.11(-Ye+Cy+Mg) \\ &= 0.22Ye-1.4Cy+1.18Mg \end{aligned} \quad (7)$$

$$2(B-Y) = -0.3(Ye - Cy + Mg) \quad (8)$$
$$-0.59(Ye + Cy - Mg)$$
$$+0.89(-Ye + Cy + Mg)$$
$$= 1.78Ye + 0.6Cy + 1.18Mg$$

The low-band converted carrier chrominance signal thus can be formed by sending out the signals according to the clock signal of the frequency four times as high as the frequency of the low-band color subcarrier and also in the following sequence:

(0.11 Ye−0.7 Cy+0.59 Mg)/1.14,
(−0.89 Ye+0.3 Cy+0.59 Mg) /2.03,
−(0.11 Ye−0.7 Cy+0.59 Mg)/1.14,
−(−0.89 Ye+0.3 Cy+0.59 Mg)/2.03

The color-burst data part is then in a sequence of 0, −0.4, 0, 0.4.

Further, the axis of modulation does not have to coincide with the color-difference signals R-Y and B-Y. For example, assuming that the modulation axis has rotated as much as an angle θ, the digital data series which represents the low-band converted carrier chrominance signal can be expressed, as mentioned in the foregoing, by formulas (9) and (10) and the color-burst data part by formulas (11) and (12) as follows:

$$(B-Y)' = [(B-Y)/2.03]\cos\theta - \quad (9)$$
$$[(R-Y)/1.14]\sin\theta$$
$$= [(-0.89/2.03)\cos\theta - (0.11/1.14)\sin\theta]Ye +$$
$$[(0.30/2.03)\cos\theta + (0.70/1.14)\sin\theta]Cy +$$
$$[(0.59/2.03)\cos\theta - (0.59/1.14)\sin\theta]Mg$$
$$(R-Y)' = [(B-Y)/2.03]\sin\theta + \quad (10)$$
$$[(R-Y)/1.14]\cos\theta$$
$$= [(-0.89/2.03)\sin\theta + (0.11/1.14)\cos\theta]Ye +$$
$$[(0.30/2.03)\sin\theta - (0.70/1.14)\cos\theta]Cy +$$
$$[(0.59/2.03)\sin\theta + (0.59/1.14)\cos\theta]Mg$$
$$\text{burst }(b) = -0.4\cos\theta \quad (11)$$
$$\text{burst }(r) = -0.4\sin\theta \quad (12)$$

The low-band converted carrier chrominance signal forming device is provided with three input terminals 11, 12 and 13 as shown in FIG. 1. An yellow complementary color signal Ye is inputted to the input terminal 11 from an image pickup system which is not shown. A cyan complementary color signal Cy is inputted from the image pickup system to the input terminal 12. A magenta complementary color signal Mg is inputted from the image pickup system to the input terminal 13.

The complementary color signal Ye inputted to the input terminal 11 is supplied to each of multipliers 101 and 104. The multiplier 101 multiplies the complementary color signal Ye by a multiplying coefficient VA and outputs the result of multiplication. The multiplier 104 multiplies the complementary color signal Ye by a multiplying coefficient VD and outputs the result of multiplication.

The complementary color signal Cy inputted to the input terminal 12 is supplied to each of multipliers 102 and 105. The multiplier 102 multiplies the complementary color signal Cy by a multiplying coefficient VB and outputs the result of multiplication. The multiplier 105 multiplies the complementary color signal Cy by a multiplying coefficient VE and outputs the result of multiplication.

The complementary color signal Mg inputted to the input terminal 13 is supplied to each of multipliers 103 and 106.

The multiplier 103 multiplies the complementary color signal Mg by a multiplying coefficient VC and outputs the result of multiplication. The multiplier 106 multiplies the complementary color signal Mg by a multiplying coefficient VF and outputs the result of multiplication.

Assuming that each of the multiplying coefficients consists of five bits and the phase of the modulation axis is at θ=80 degrees, for example, the values of the multiplying coefficients can be obtained from the formulas (9) and (10) as shown below:

| VA = −0.65625 | VB = 0.0625 | VC = 0.59375 |
|---|---|---|
| VD = −0.28125 | VE = 1.0 | VF = −0.71875 |

The outputs of the multipliers 101, 102 and 103 are supplied to an adder 111. The adder 111 adds the outputs of the multipliers 101, 102 and 103 together and outputs the result of addition. The outputs of the multipliers 104, 105 and 106 are supplied to an adder 112. The adder 112 adds the outputs of the multipliers 104, 105 and 106 together and outputs the result of addition. The output of the adder 111 represents a color-difference signal R-Y and the output of the adder 112 represents a color-difference signal B-Y.

The output of the adder 111 is supplied to a selector 131 and the output of the adder 112 is supplied to a selector 132. The selector 131 selects and outputs, according to a signal BFLG inputted to a terminal 16, either the output of the adder 111 or a signal VH which represents color-burst data. The signal BFLG indicates a color-burst state. The selector 131 selects and outputs the signal VH when the level of the signal BFLG is high indicating the color-burst state, or the output of the adder 111 when the level of the signal BFLG is low indicating no color-burst state.

The selector 132 is likewise arranged to select and output, according to the signal BFLG, either the output of the adder 112 or a signal VG which represents color-burst data. The selector 132 selects and outputs the signal VG when the signal BFLG is at a high level thus indicating the color-burst state, or the output of the adder 112 when the signal BFLG is at a low level indicating no color-burst state.

For example, assuming that each of the multiplying coefficients consists of five bits and the phase of the modulation axis is at θ=80 degrees, the values of the signals VH and VG can be obtained from the above-stated formulas (11) and (12) as follows:

| VH = −0.0625 | VG = −0.625 |
|---|---|

The output of the selector 131 is supplied to a selector 141 and an inverter 121. The inverter 121 inverts the sign of the output of the selector 131 and outputs the inverted output. The phase of the output of the inverter 121 differs 180 degrees from that of the output of the selector 131. The output of the inverter 121 is supplied to the selector 141.

The output of the selector 132 is supplied to the selector 141 and an inverter 122. The inverter 122 inverts the sign of the output of the selector 132 and outputs the inverted output. The phase of the output of the inverter 122 differs 180 degrees from that of the output of the selector 132. The output of the inverter 122 is supplied to the selector 141.

The selector 141 is arranged to select and output one of the output of the selector 131, that of the inverter 121, that of the selector 132 and that of the inverter 122, according to a signal CSEQ which is inputted to a terminal 15. The signal CSEQ indicates the phase of the low-band converted carrier chrominance signal obtained at every 90 degrees and is composed of a selection signal which repeatedly appears at intervals of the period of the low-band converted carrier chrominance signal. The selector 141 outputs a digital data series CRM according to the selection signal. The digital data series CRM is composed of a data train appearing at every 90 degrees of the low-band converted carrier chrominance signal.

Further, depending on the recording format of the video tape recorders, the phase of the low-band converted carrier chrominance signal is arranged to be inverted for every horizontal line in recording for the purpose of reducing a crosstalk taking place between adjacent tracks among a plurality of tracks on a magnetic tape at the time of reproduction. For this purpose, the selection (control) signal CSEQ is arranged to be switched between a signal CSEQE and a signal CSEQO, as shown in FIG. 3, for every odd-number-th horizontal scanning period and every even-number-th horizontal scanning period. By virtue of such arrangement, signals CRME and CRMO can be formed, as shown in FIG. 3, as digital data series of the low-band converted carrier chrominance signal conforming to the recording format of the video tape recorder of the kind mentioned above.

The digital data series CRM from the selector 141 is supplied to a D/A converter 151. The D/A converter 151 is arranged to convert the digital data series CRM into an analog signal in accordance with a clock signal 4fl which is inputted to a terminal 14. The clock signal 4fl is of a value which is four times as much as the frequency of the low-band color subcarrier.

The analog signal from the D/A converter 151 is supplied to a low-pass filter (LPF) 161 and is outputted from an output terminal 21 as an analog low-band converted carrier chrominance signal.

The operation of this embodiment is described with reference to FIG. 3 as follows:

As shown in FIG. 3, signals Y0, Y1, Y2, . . . , are first serially inputted to the input terminal 11 as the yellow complementary color signal Ye. Signals C0, C1, C2, . . . , are likewise inputted to the input terminal 12 as the cyan complementary color signal Cy. Signals M0, M1, M2, . . . , are inputted to the input terminal 13 as the magenta complementary color signal Mg.

When the complementary color signal Y0 is inputted to the input terminal 11, the complementary color signal C0 to the input terminal 12 and the complementary color signal M0 to the input terminal 13, a signal PRY0 is formed as the color-difference signal R-Y, a signal NRY0 is formed as the color-difference signal –(R-Y), a signal PBY0 is formed as the color-difference signal B-Y, and a signal NBY0 is formed as the color-difference signal –(B-Y). A data series of PRY0, PBY0, NRY0 and NBY0 is formed as the data series CRM.

Next, a complementary color signal Y1 is inputted to the input terminal 11, a complementary color signal C1 to the input terminal 12 and a complementary color signal M1 to the input terminal 13. If the level of the signal BFLG becomes high when this data is inputted, a signal PBST is selected in place of the color-difference signal B-Y and a signal NBST is selected in place of the color-difference signal –(B-Y). Then, a data series of 0, PBST, 0 and NBST is formed as the data series CRM. This data series CRM becomes a color-burst data part.

After that, the data series CRM is likewise formed and the digital data series with the color-burst data added thereto is D/A converted according to the clock signal of a frequency which is four times as high as the frequency of the low-band color subcarrier. The D/A converted signal is restored to an analog signal through the LPF 161 to obtain the low-band converted carrier chrominance signal.

Since the low-band converted carrier chrominance signal is thus obtained by carrying out arithmetic operation processes such as multiplication and addition, it is not necessary to increase the scale of circuit arrangement.

In quantizing the coefficients of the formulas (9) and (10) by normalizing them, the absolute value sum of coefficient quantizing errors can be reduced by carrying out the quantization by five bits at θ=80 degrees, as compared with a case where the quantization by five bits is carried out at θ=0 degree. Further, with the value of θ appositely selected, the coefficient quantization error for a color which is considered to have relatively conspicuous fluctuations in hue with respect to visual sensations can be minimized.

As described above, the low-band converted carrier chrominance signal forming device of this embodiment is arranged to receive the complementary color signals of yellow, cyan and magenta and to form a low-band converted carrier chrominance signal by carrying out the process of arithmetic operations on these complementary color signals. The arrangement enables the embodiment to obtain the low-band converted carrier chrominance signal with a compact circuit arrangement.

What is claimed is:

1. A carrier chrominance signal forming device comprising:
   a) input means for receiving a plurality of kinds of video complementary color signals;
   b) color-difference signal forming means for forming a first color-difference signal and a second color-difference signal by performing a coefficient multiplying process to respectively multiply by coefficients the plurality of kinds of complementary color signals received by said input means and performing an adding process to add together the plurality of kinds of complementary color signals which have been subjected to the coefficient multiplying process;
   c) color-burst-flag signal adding means for adding color-burst flag signals to the first color-difference signal and the second color-difference signal formed by said color-difference signal forming means;
   d) inverted color-difference signal forming means for forming an inverted first color-difference signal having a phase which differs 180 degrees from a phase of the first color-difference signal to which the color-burst flag signal has been added by said color-burst-flag signal adding means and an inverted second color-difference signal having a phase which differs 180 degrees from a phase of the second color-difference signal to which the color-burst flag signal has been added by said color-burst-flag signal adding means; and
   e) selective output Means for serially outputting, in a sequence and at an interval according to a color subcarrier, the first color-difference signal and the second color-difference signal to which the color-burst-flag signals have been added by said color-burst-flag signal adding means and the inverted first color-difference signal and the inverted second color-difference signal which have been formed by said inverted color-difference signal forming means.

2. A device according to claim 1, wherein said input means is arranged to receive complementary color signals of yellow, cyan and magenta.

3. A device according to claim 1, wherein said input means is arranged to receive the plurality of kinds of complementary color signals outputted from an image pickup system.

4. A device according to claim 1, wherein said selective output means is arranged to serially switch and output, in synchronism with a clock signal of a frequency which is four times as high as a frequency of the color subcarrier, the first color-difference signal and the second color-difference signal to which the color-burst flag signals have been added by said color-burst-flag signal adding means and the inverted first color-difference signal and the inverted second color-difference signal which have been formed by said inverted color-difference signal forming means.

5. A carrier chrominance signal forming device comprising:
   a) input means for receiving a plurality of kinds of video com plementary color signals;
   b) color-difference signal forming means for forming a first color-difference signal and a second color-difference signal by performing a coefficient multiplying process to respectively multiply by coefficients the plurality of kinds of complementary color signals received by said input means and performing an adding process to add together the plurality of kinds of complementary color signals which have been subjected to the coefficient multiplying process;
   c) color-burst-flag signal adding means for adding color-burst flag signals to the first color-difference signal and the second color-difference signal formed by said color-difference signal forming means;
   d) inverted color-difference signal forming means for forming an inverted first color-difference signal having a phase which differs 180 degrees from a phase of the first color-difference signal to which the color-burst flag signal has been added by said color-burst-flag signal adding means and an inverted second color-difference signal having a phase which differs 180 degrees from a phase of the second color-difference signal to which the color-burst flag signal has been added by said color-burst-flag signal adding means; and
   e) selective output means for serially outputting, in a sequence and at an interval according to a low-band color subcarrier, the first color-difference signal and the second color-difference signal to which the color-burst flag signals have been added by said color-burst-flag signal adding means and the inverted first color-difference signal and the inverted second color-difference signal which have been formed by said inverted color-difference signal forming means.

6. A device according to claim 5, wherein said selective output means is arranged to serially switch and output, in synchronism with a clock signal of a frequency which is four times as high as a frequency of the low-band color subcarrier, the first color-difference signal and the second color-difference signal to which the color-burst flag signals have been added by said color-burst-flag signal adding means and the inverted first color-difference signal and the inverted second color-difference signal which have been formed by said inverted color-difference signal forming means.

7. A carrier chromiinance signal forming device comprising:
   a) data input means for receiving a plurality of kinds of digital video complementary color signals;
   b) digital color-difference data forming means for forming a first digital color-difference data and a second digital color-difference data by performing a coefficient multiplying process to respectively multiply by coefficients the plurality of kinds of complementary color data received by said data input means and performing an adding process to add together the plurality of kinds of complementary color data which have been subjected to the coefficient multiplying process;
   c) color-burst flag data adding means for adding color-burst flag data to the first digital color-difference data and the second digital color-difference data formed by said digital color-difference data forming means;
   d) inverted digital color-difference data forming means for forming an inverted first digital color-difference data having a phase which differs 180 degrees from a phase of the first digital color-difference data to which the color-burst flag data has been added by said color-burst-flag data adding means and an inverted second color-difference data having a phase which differs 180 degrees from a phase of the second digital color-difference data to which the color-burst flag data has been added by said color-burst-flag data adding means;
   e) data selective output means for serially outputting in a sequence and at an interval according to a color subcarrier, the first digital color-difference data and the second digital color-difference data to which the color-burst-flag data have been added by said color-burst-flag data adding means and the inverted first digital color-difference data and the inverted second digital color-difference data which have been formed by said inverted digital color-difference data forming means; and
   f) digital-to-analog converting means for digital-to-analog converting and outputting data outputted from said data selective output means.

8. A device according to claim 7, wherein said data input means is arranged to input digital complementary color data of yellow, cyan and magenta.

9. A device according to claim 7, wherein said data input means is arranged to input the plurality of kinds of complementary color data outputted from an image pickup system.

10. A device according to claim 7, wherein said data selective output means is arranged to serially switch and output, in synchronism with a clock signal of a frequency which is four times as high as a frequency of the color subcarrier, the first digital color-difference data and the second digital color-difference data to which the color-burst flag data have been added by said color-burst-flag data adding means and the inverted first digital color-difference data and the inverted second digital color-difference data which have been formed by said inverted digital color-difference data forming means.

11. A device according to claim 10, wherein said digital-to-analog converting means is arranged to digital-to-analog convert and output data outputted from said data selective output means in synchronism with the clock signal of the frequency which is four times as high as the frequency of the color subcarrier.

12. A carrier chrominance signal forming device comprising:
   a) data input means for receiving a plurality of kinds of digital video complementary color signals;
   b) digital color-difference data forming means for forming a first digital color-difference data and a second digital color-difference data by performing a coefficient multiplying process to respectively multiply by coefficients the plurality of kinds-of complementary color data received by said data input means and performing by adding process to add together the plurality of kinds of complementary color data which have been subjected to the coefficient multiplying process;

c) color-burst-flag data adding means for adding color-burst flag data to the first digital color-difference data and the second digital color-difference data formed by said digital color-difference data forming means;

d) inverted digital color-difference data forming means for forming an inverted first digital color-difference data having a phase which differs 180 degrees from a phase of the first digital color-difference data to which the color-burst flag data has been added by said color-burst-flag data adding means and an inverted second digital color-difference data having a phase which differs 180 degrees from a phase of the Second digital color-difference data to which the color-burst flag data has been added by said color-burst-flag data adding means;

e) data selective output means for serially outputting, in a sequence and at an interval according to a low-band color subcarrier, the first digital color-difference data and the second digital color-difference data to which the color-burst flag data have been added by said color-burst-flag data adding means and the inverted first digital color-difference data and the inverted second digital color-difference data which have been formed by said inverted digital color-difference data forming means; and f) digital-to-analog converting means for digital-to-analog converting and outputting data outputted from said data selective output means.

13. A device according to claim 12, wherein said data selective output means is arranged to serially switch and output, in synchronism with a clock signal of a frequency which is four times as high as a frequency of the low-band color subcarrier, the first digital color-difference data and the second digital color-difference data to which the color-burst flag data have been added by said color-burst-flag data adding means and the inverted first digital color-difference data and the inverted second digital color-difference data which have been formed by said inverted digital color-difference data forming means.

14. A carrier chrominance signal forming device comprising:

a) first input means for receiving a first complementary color signal;

b) second input means for receiving a second complementary color signal;

c) third input means for receiving a third complementary color signal;

d) first coefficient multiplying process means for multiplying by a first coefficient the first complementary color signal received by said first input means;

e) second coefficient multiplying process means for multiplying by a second coefficient the second complementary color signal received by said second input means;

f) third coefficient multiplying process means for multiplying by a third coefficient the third complementary color signal received by said third input means;

g) fourth coefficient multiplying process means for multiplying by a fourth coefficient the first complementary color signal received by said first input means;

h) fifth coefficient multiplying process means for multiplying by a fifth coefficient the second complementary color signal received by said second input means;

i) sixth coefficient multiplying process means for multiplying by a sixth coefficient the third complementary color signal received by said third input means;

j) first color-difference signal forming means for forming a first color-difference signal by performing an adding process to add together the first complementary color signal coefficient-multiplied by said first coefficient multiplying process means, the second complementary color signal coefficient-multiplied by said second coefficient multiplying process means and the third complementary color signal coefficient-multiplied by said third coefficient multiplying process means;

k) second color-difference signal forming means for forming a second color-difference signal by performing an adding process to add together the first complementary color signal coefficient-multiplied by said fourth coefficient multiplying process means, the second complementary color signal coefficient-multiplied by said fifth coefficient multiplying process means and the third complementary color signal coefficient-multiplied by said sixth coefficient multiplying process means;

l) first color-burst-flag signal adding means for adding a color-burst flag signal to the first color-difference signal formed by said first color-difference signal forming means;

m) second color-burst-flag signal adding means for adding a color-burst flag signal to the second color-difference signal formed by said second color-difference signal forming means;

n) inverted first color-difference signal forming means for forming an inverted first color-difference signal having a phase which differs 180 degrees from a phase of the first color-difference signal to which the color-burst flag signal has been added by said first color-burst-flag signal adding means;

o) inverted second color-difference signal forming means for forming an inverted second color-difference signal having a phase which differs 180 degrees from the phase of the second color-difference signal to which the color-burst flag signal has been added by said second color-burst-flag signal adding means; and p) selective output means for serially outputting, in a sequence and at an interval according to a color subcarrier, the first color-difference signal to which the color-burst flag signal has been added by said first color-burst-flag signal adding means, the second color-difference signal to which the color-burst flag signal has been added by said second color-burst-flag signal adding means, the inverted first color-difference signal formed by said inverted first color-difference signal forming means and the inverted second color-difference signal formed by said inverted second color-difference signal forming means.

15. A device according to claim 14, wherein the first complementary color signal includes a signal indicating yellow, the second complementary color signal includes a signal indicating cyan, and the third complementary color signal includes a signal indicating magenta.

16. A device according to claim 14, wherein said selective output means is arranged to serially switch and output, in synchronism with a clock signal of a frequency which is four times as high as a frequency of the color subcarrier, the first color-difference signal to which the color-burst flag signal has been added by said first color-burst-flag signal adding means, the second color-difference signal to which the color-burst flag signal has been added by said second color-burst-flag signal adding means, the inverted first color-difference signal formed by said inverted first color-difference signal forming means and the inverted second color-difference signal formed by said inverted second color-difference signal forming means.

17. A device according to claim 14, wherein the first coefficient includes "−0.65625", the second coefficient includes "0.0625", the third coefficient includes "0.59375", the fourth coefficient includes "−0.28125", the fifth coefficient includes "1.0", and the sixth coefficient includes "−0.71875".

18. A low-band converted carrier chrominance signal forming device comprising:
a) first input means for receiving a first complementary color signal;
b) second input means for receiving a second complementary color signal;
c) third input means for receiving a third complementary color signal;
d) first coefficient multiplying process means for multiplying by a first coefficient the first complementary color signal received by said first input means;
e) second coefficient multiplying process means for multiplying by a second coefficient the second complementary color signal received by said second input means;
f) third coefficient multiplying process means for multiplying by a third coefficient the third complementary color signal received by said third input means;
g) fourth coefficient multiplying process means for multiplying by a fourth coefficient the first complementary color signal received by said first input means;
h) fifth coefficient multiplying process means for multiplying by a fifth coefficient the second complementary color signal received by said second input means;
i) sixth coefficient multiplying process means for multiplying by a sixth coefficient the third complementary color signal received by said third input means;
j) first color-difference signal forming means for forming a first color-difference signal by performing an adding process to add together the first complementary color signal coefficient-multiplied by said first coefficient multiplying process means, the second complementary color signal coefficient-multiplied by said second coefficient multiplying process means and the third complementary color signal coefficient-multiplied by said third coefficient multiplying process means;
k) second color-difference signal forming means for forming a second color-difference signal by performing an adding process to add together the first complementary color signal coefficient-multiplied by said fourth coefficient multiplying process means, the second complementary color signal coefficient-multiplied by said fifth coefficient multiplying process means and the third complementary color signal coefficient-multiplied by said sixth coefficient multiplying process means;
l) first color-burst-flag signal adding means for adding a color-burst flag signal to the first color-difference signal formed by said first color-difference signal forming means;
m) second color-burst-flag signal adding means for adding a color-burst flag signal to the second color-difference signal formed by said second color-difference signal forming means;
n) inverted first color-difference signal forming means for forming an inverted first color-difference signal having a phase which differs 180 degrees from a phase of the first color-difference signal to which the color-burst flag signal has been added by said first color-burst-flag signal adding means;
o) inverted second color-difference signal forming means for forming an inverted second color-difference signal having a phase which differs 180 degrees from the phase of the second color-difference signal to which the color-burst flag signal has been added by said second color-burst-flag signal adding means; and
p) selective output means for serially outputting, in a sequence and at an interval according to a low-band color subcarrier, the first color-difference signal to which the color-burst flag signal has been added by said first color-burst-flag signal adding means, the second color-difference signal to which the color-burst flag signal has been added by said second color-burst-flag signal adding means, the inverted first color-difference signal formed by said inverted first color-difference signal forming means and the inverted second color-difference signal formed by said inverted second color-difference signal forming means.

19. A device according to claim 18, wherein the first complementary color signal includes a signal indicating yellow, the second complementary color signal includes a signal indicating cyan, and the third complementary color signal includes a signal indicating magenta.

20. A device according to claim 18, wherein said selective output means is arranged to serially switch and output, in synchronism with a clock signal of a frequency which is four times as high as a frequency of the low-band color subcarrier, the first color-difference signal to which the color-burst flag signal has been added by said first color-burst-flag signal adding means, the second color-difference signal to which the color-burst flag signal has been added by said second color-burst-flag signal adding means, the inverted first color-difference signal formed by said inverted first color-difference signal forming means and the inverted second color-difference signal formed by said inverted second color-difference signal forming means.

21. A device according to claim 18, wherein the first coefficient includes "−0.65625", the second coefficient includes "0.0625", the third coefficient includes "0.59375", the fourth coefficient includes "−0.28125", the fifth coefficient includes "1.0", and the sixth coefficient includes "−0.71875".

22. A carrier chrominance signal forming device comprising:
a) first data input means for receiving first digital complementary color data;
b) second data input means for receiving second digital complementary color data;
c) third data input means for receiving third digital complementary color data;
d) first coefficient multiplying process means for multiplying by a first coefficient the first digital complementary color data received by said first data input means;
e) second coefficient multiplying process means for multiplying by a second coefficient the second digital complementary color data received by said second data input means;
f) third coefficient multiplying process means for multiplying by a third coefficient the third digital complementary color data received by said third data input means;
g) fourth coefficient multiplying process means for multiplying by a fourth coefficient the first digital complementary color data received by said first data input means;

h) fifth coefficient multiplying process means for multiplying by a fifth coefficient the second digital complementary color data received by said second data input means;

i) sixth coefficient multiplying process means for multiplying by a sixth coefficient the third digital complementary color signal received by said third data input means;

j) first digital color-difference data forming means for forming first digital color-difference data by performing an adding process to add together the first digital complementary color data coefficient-multiplied by said first coefficient multiplying process means, the second digital complementary color data coefficient-multiplied by said second coefficient multiplying process means and the third digital complementary color data coefficient-multiplied by said third coefficient multiplying process means;

k) second digital color-difference data forming means for forming second digital color-difference data by performing an adding process to add together the first digital complementary color data coefficient-multiplied by said fourth coefficient multiplying process means, the second digital complementary color data coefficient-multiplied by said fifth coefficient multiplying process means and the third digital complementary color data coefficient-multiplied by said sixth coefficient multiplying process means;

l) first color-burst-flag data adding means for adding color-burst flag data to the first digital color-difference data formed by said first digital color-difference data forming means;

m) second color-burst-flag data adding means for adding color-burst flag data to the second digital color-difference data formed by said second digital color-difference data forming means;

n) inverted first digital color-difference data forming means for forming inverted first digital color-difference data having a phase which differs 180 degrees from a phase of the first digital color-difference data to which the color-burst flag data has been added by said first color-burst-flag data adding means;

o) inverted second digital color-difference data forming means for forming inverted second digital color-difference data having a phase which differs 180 degrees from a phase of the second digital color-difference data to which the color-burst flag data has been added by said second color-burst-flag data adding means;

p) data selective output means for serially outputting, in a sequence and at an interval according to a color subcarrier, the first digital color-difference data to which the color-burst flag data has been added by said first color-burst-flag data adding means, the second digital color-difference data to which the color-burst flag data has been added by said second color-burst-flag data adding means, the inverted first digital color-difference data formed by said inverted first digital color-difference data forming means and the inverted second digital color-difference data formed by said inverted second digital color-difference data forming means; and q) digital-to-analog converting means for digital-to-analog converting and outputting data outputted from said data selective output means.

23. A device according to claim 22, wherein the first digital complementary color data includes data indicating yellow, the second digital complementary color data includes data indicating cyan, and the third digital complementary color data includes data indicating magenta.

24. A device according to claim 22, wherein said data selective output means is arranged to serially switch and output, in synchronism with a clock signal of a frequency which is four times as high as a frequency of the color subcarrier, the first digital color-difference data to which the color-burst flag data has been added by said first color-burst-flag data adding means, the second digital color-difference data to which the color-burst flag data has been added by said second color-burst-flag data adding means, the inverted first digital color-difference data formed by said inverted first digital color-difference data forming means and the inverted second digital color-difference data formed by said inverted second digital color-difference data forming means.

25. A device according to claim 22, wherein the first coefficient includes "−0.65625", the second coefficient includes "0.0625", the third coefficient includes "0.59375", the fourth coefficient includes "−0.28125", the fifth coefficient includes "1.0", and the sixth coefficient includes "−0.71875".

26. A low-band converted carrier chrominance signal forming device comprising:

a) first data input means for receiving first digital complementary color data;

b) second data input means for receiving second digital complementary color data;

c) third data input means for receiving third digital complementary color data;

d) first coefficient multiplying process means for multiplying by a first coefficient the first digital complementary color data received by said first data input means;

e) second coefficient multiplying process means for multiplying by a second coefficient the second digital complementary color data received by said second data input means;

f) third coefficient multiplying process means for multiplying by a third coefficient the third digital complementary color data received by said third data input means;

g) fourth coefficient multiplying process means for multiplying by a fourth coefficient the first digital complementary color data received by said first data input means;

h) fifth coefficient multiplying process means for multiplying by a fifth coefficient the second digital complementary color data received by said second data input means;

i) sixth coefficient multiplying process means for multiplying by a sixth coefficient the third digital complementary color signal received by said third data input means;

j) first digital color-difference data forming means for forming first digital color-difference data by performing an adding process to add together the first digital complementary color data coefficient-multiplied by said first coefficient multiplying process means, the second digital complementary color data coefficient-multiplied by said second coefficient multiplying process means and the third digital complementary color data coefficient-multiplied by said third coefficient multiplying process means;

k) second digital color-difference data forming means for forming second digital color-difference data by performing an adding process to add together the first digital complementary color data coefficient-multiplied by said fourth coefficient multiplying process means, the second digital complementary color data coefficient-multiplied by said fifth coefficient multiplying process means and the third digital complementary color data coefficient-multiplied by said sixth coefficient multiplying process means;

l) first color-burst-flag data adding means for adding color-burst flag data to the first digital color-difference data formed by said first digital color-difference data forming means;

m) second color-burst-flag data adding means for adding color-burst flag data to the second digital color-difference data formed by said second digital color-difference data forming means;

n) inverted first digital color-difference data forming means for forming inverted first digital color-difference data having a phase which differs 180 degrees from a phase of the first digital color-difference data to which the color-burst flag data has been added by said first color-burst-flag data adding means;

o) inverted second digital color-difference data forming means for forming inverted second digital color-difference data having a phase which differs 180 degrees from a phase of the second digital color-difference data to which the color-burst flag data has been added by said second color-burst-flag data adding means;

p) data selective output means for serially outputting, in a sequence and at an interval according to a low-band color subcarrier, the first digital color-difference data to which the color-burst flag data has been added by said first color-burst-flag data adding means, the second digital color-difference data to which the color-burst flag data has been added by said second color-burst-flag data adding means, the inverted first digital color-difference data formed by said inverted first digital color-difference data forming means and the inverted second digital color-difference data formed by said inverted second digital color-difference data forming means; and q) digital-to-analog converting means for digital-to-analog converting and outputting data outputted from said data selective output means.

27. A device according to claim 26, wherein the first digital complementary color data includes data indicating yellow, the second digital complementary color data includes data indicating cyan, and the third digital complementary color data includes data indicating magenta.

28. A device according to claim 26, wherein said data selective output means is arranged to serially switch and output, in synchronism with a clock signal of a frequency which is four times as high as a frequency of the low-band color subcarrier, the first digital color-difference data to which the color-burst flag data has been added by said first color-burst-flag data adding means, the second digital color-difference data to which the color-burst flag data has been added by said second color-burst-flag data adding means, the inverted first digital color-difference data formed by said inverted first digital color-difference data forming means and the inverted second digital color-difference data formed by said inverted second digital color-difference data forming means.

29. A device according to claim 26, wherein the first coefficient includes "−0.65625", the second coefficient includes "0.0625", the third coefficient includes "0.59375", the fourth coefficient includes "−0.28125", the fifth coefficient includes "1.0", and the sixth coefficient includes "−0.71875".

* * * * *

UNITED STATES PATENT AND TRADEMARK OFFICE
CERTIFICATE OF CORRECTION

PATENT NO. : 5,870,152
DATED : February 9, 1999
INVENTOR(S) : Tsutomu Fukatsu

It is certified that error appears in the above-identified patent and that said Letters Patent is hereby corrected as shown below:

Col. 7, line 34, delete "cut" and insert -- out --.
Col. 12, line 54, delete "Means" and insert -- means --.
Col. 13, line 16, delete "com plementary" and insert -- complementary --.
Col. 15, line 16, delete "Second" and insert -- second --.

Signed and Sealed this

Seventh Day of December, 1999

*Attest:*

Q. TODD DICKINSON

*Attesting Officer*  *Acting Commissioner of Patents and Trademarks*